INVENTORS
GAYLORD W. BROWN
DONALD J. RISE

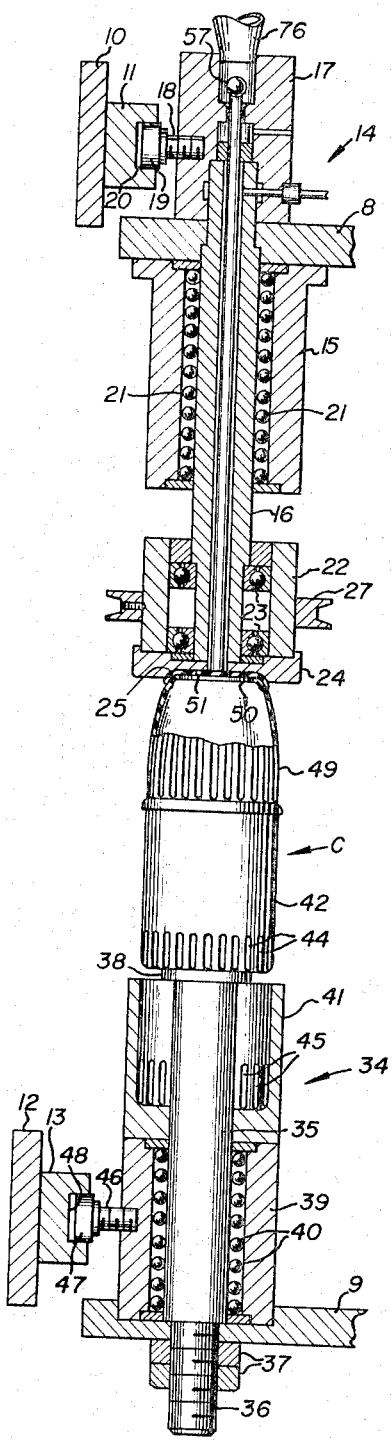

INVENTORS
GAYLORD W. BROWN
DONALD J. RISE
BY
Learman and McCulloch

United States Patent Office 3,316,135
Patented Apr. 25, 1967

3,316,135
METHOD AND APPARATUS FOR FRICTION WELDING PLASTIC CLOSURES TO PLASTIC CONTAINERS
Gaylord W. Brown and Donald J. Rise, Beaverton, Mich., assignors to Brown Machine Co., Beaverton, Mich., a corporation of Michigan
Filed Aug. 23, 1963, Ser. No. 304,169
14 Claims. (Cl. 156—69)

This invention relates to welding methods and apparatus and more particularly to methods and apparatus for friction welding plastic parts.

In the manufacture of plastic containers it is conventional to form a hollow container body, fill the latter with material and subsequently close the container with a cap or cover. Heretofore, it has been common to secure the cover to the container adhesively. The use of adhesives for securing covers presents many problems which need not be enumerated in detail. Suffice it to say that the use of adhesives for the stated purpose requires means for containing and feeding the adhesives at the proper time to the proper zone, presents problems in avoiding over and under application of the adhesives, and sometimes results in imperfect seals or contamination of the contents of the container.

An object of this invention is to provide welding methods and apparatus which overcome the disadvantages of previously known securing methods and apparatus.

Another object of the invention is to provide apparatus for effecting friction welding of relatively movable plastic parts which accomplishes its objective by effecting relative rotation of the two parts while maintaining the parts in intimate, face-to-face engagement.

A further object of the invention is to provide welding apparatus of the character referred to which is operable to discontinue relative rotation of the parts to be welded, once the weld has been accomplished.

Another object of the invention is to provide apparatus for effecting frictional welding of two relatively rotatable plastic parts which includes apparatus for effecting such relative rotation without risking spilling of the contents of one of the parts.

A further object of the invention is to provide welding apparatus of the character described which is operable only in the event two parts to be welded are properly positioned relatively to one another.

A further object of the invention is to provide a method of welding relatively rotatable parts to one another in such manner as to assure a complete and perfect seal between the parts.

Another object of the invention is to provide a method of welding a cap or cover to a container and in such manner as to prevent inadvertent removal of the contents of the container in the event the cap or cover initially is improperly placed or absent.

Briefly, the invention is concerned with the friction welding of closures which are supplied in preassembled position on the container but are not actually secured thereto. The closures are removed from the containers and caused to rotate by a drive which is disengaged prior to the time the closures are returned to the containers to friction weld them thereto.

Other objects and advantages of the invention will be pointed out specifically or will become apparent from the following description when it is considered in conjunction with the appended claims and the accompanying drawings, in which:

FIGURE 3 is a view similar to FIGURE 1, but illustrating the container holding parts in the positions they occupy after return of the rotating closure to the container for friction welding, and at the completion of the welding cycle just prior to removal of the welded parts from the assembly machine;

FIGURE 4 is a fragmentary, top plan view of a portion of the assembly machine;

FIGURE 6 is an enlarged, sectional view of a typical suction control valve and illustrating the latter in its inactive position;

FIGURE 7 is a view similar to FIGURE 6, but illustrating the valve in its activated position.

Figure 1:
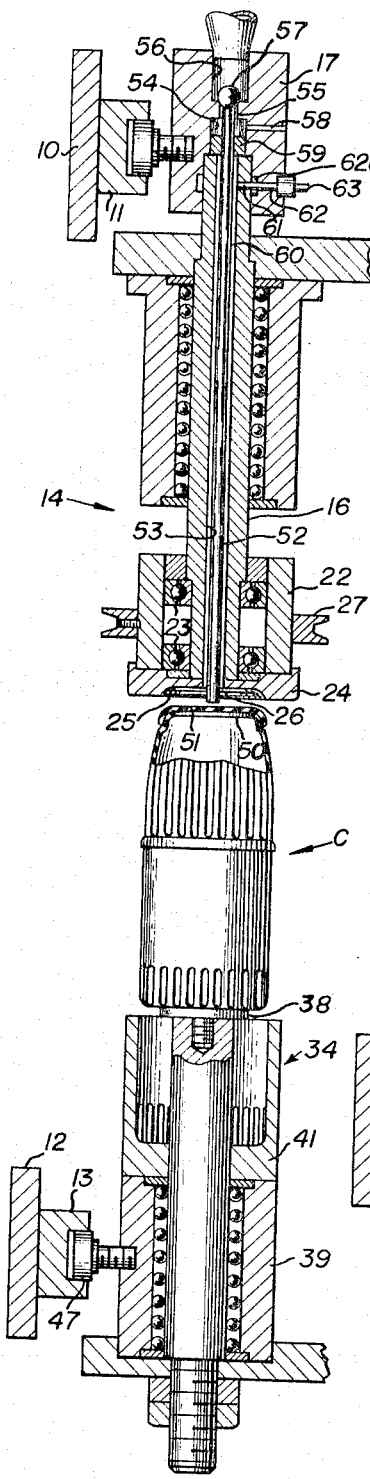
FIGURE 1 is a fragmentary, vertical sectional view of apparatus constructed in accordance with the invention and illustrating the container holding parts in the positions they occupy just prior to the beginning of a welding cycle following introduction of the container to the machine with the closure or cap disposed in preassembled position on the container but not actually secured thereto.

Apparatus constructed in accordance with the invention is predicated on many of the concepts set forth in copending application Ser. No. 264,809, filed Mar. 13, 1963, and to which reference may be had for a more comprehensive discussion of the principles and machinery on which the welding techniques herein disclosed are based. Briefly, however, apparatus constructed in accordance with this invention includes an assembling machine 1 (see FIGURE 4) of the kind disclosed more fully in the above identified copending application and which includes a main frame 2 in which is rotatably mounted a vertical column or shaft 3. Fixed to the shaft 3 is a sprocket wheel 4 around which is trained a drive chain 5 that is driven by an electric or other motor (not shown) to effect rotation of the shaft 3 clockwise, as viewed in FIGURE 4. As in the aforementioned copending application, shaft 3 may be continuously driven when the machine is in operation. Secured to the shaft 3 is an upper supporting plate 6 and a similar, lower supporting plate 7 (FIGURE 2). Welded or otherwise suitably fixed to the upper plate 6 is a plurality of radially extending supporting arms 8, and similar arms 9 are secured to the plate 7 directly beneath the arms 8. Fixed on the main frame 1 is an annular, upper ring 10 that lies radially outwardly of the arms 8 and which carries a grooved cam 11. Below the ring 10 and also fixed on the frame 1 is a similar ring 12 (FIGURES 1-3) that lies radially outwardly of and adjacent the arms 9 and which carries a grooved cam 13.

Mounted at the radially outer end of each support arm 8 is a first or upper carrier member generally designated 14 comprising a cylinder 15 that may be welded or otherwise suitably fixed to the lower surface of the arm 8. Slideably mounted for vertical movements within the cylinder 15 is a shaft 16 that is fixed at its upper end to a block 17 located above the arm 8. Secured to the block 17 is a stub shaft 18 on which is journaled a cam follower or roller 19 that rides in a groove 20 formed in the cam 11 so as to effect vertical reciprocating movements of the block 17 and the shaft 16 as the member 14 is rotated with the supporting plate 6. The shaft 16 is guided in its vertical movements by ball bearings 21 that e interposed between the shaft and the inner surface the cylinder 15.

A rotatable head 22 is journaled on the lower end of e shaft 16 by suitable bearings 23 and has fixed to its wer end an annular, article engaging member 24 having centrally oriented, dish-shaped recess 25 formed there-. The member 24 also is provided with a central open-g 26 therethrough for a purpose which presently will be plained.

Means for effecting rotation of the head 22 and of the ember 24 comprises a pulley 27 that is fixed on the head 2 and which is adapted to engage a belt 28 (see FIGURE ) trained around pulleys 29, 30 and 31 which are mount-d on the frame 2. The belt 28 may be driven by means f an electric motor 32 that is supported on the frame 2 nd which is coupled to the pulley 31 by a drive belt 33. s is indicated in FIGURE 4, the belt 28 is located at such osition as to be engageable with each driven pulley 27 uring a portion only of the movement of the associated embers 14 about the axis of the shaft 3.

A second or lower carrier member 34 is mounted on ach lower supporting plate 9 and comprises a shaft 35 aving a threaded extension 36 which passes through an pening in the member 9 and is retained in place by lock uts 37. At its upper end the shaft 35 supports a disk 8 that provides a seat for a container C, the component arts of which are made of heat fusible plastic materials uch as polystyrene, linear polyethylene, or the like. urrounding the shaft 35 and slideable longitudinally on he latter is a sleeve 39 that is guided in its sliding move-ents by balls 40 interposed between the members 35 nd 39. Fixed to the sleeve 39 is a holding or gripping member 41 that is of such size as to receive the lower ortion 42 of the container C therein. The lower end f the container C is provided with longitudinally extend-ng flutes 44 and the inner surface of the gripping mem-er 41 is provided with mating ribs 45 that engage and rip the flutes 44.

Means for effecting raising and lowering movements of he carrier member 34 includes a stub shaft 46 on which s journaled a wheel 47 that rides in a groove 48 formed n the cam 13. As will be explained in more detail here-nafter, the vertical movements of the member 34 are so imed by the cam 13 as to cooperate with the raising and owering movements of the member 14 under the control f its cam 11, but the movements of the members 14 and 34 are independent of one another.

The container C includes an upper section 49 that may be fused or welded to the lower part 42 in the manner disclosed in the aforementioned application, and termi-nates at its upper end in an opening 50 that is adapted to be closed by a cover or cap 51 which may be formed of the same materials mentioned earlier. The cap 51 may or may not have material dispensing openings adjacent its periphery, depending on the contents of the container, but in any event it is necessary that at least some portion of the cap be imperforate.

Figure 2:
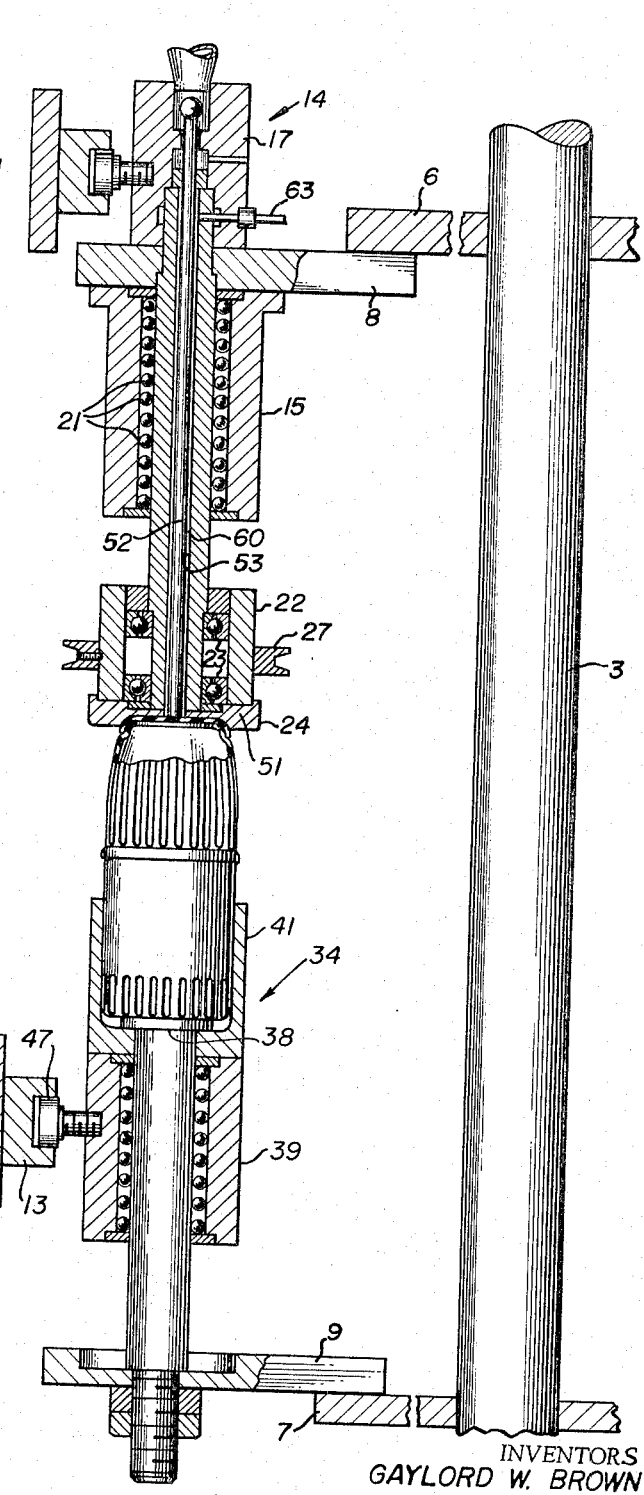
FIGURE 2 is a view similar to FIGURE 1, but illustrating the container holding parts in a more advanced stage of the operation when the upper closure holding part has been moved into engagement with the closure and the suction applying mechanism has been activated to retain the closure in the holder so that it can be lifted off the container.

In the initial position of the members 14 and 34, they are maintained by their respective cams 11 and 13 in spaced apart relation, as is indicated in FIGURE 1. The spacing between the annular member 24 and the seat 38 is greater than the overall height of the container C so as to enable the latter to be accommodated therebetween. In these positions of the parts a valve actuating stem or rod 52 that is slideably mounted in a bore 53 formed in the shaft 16 extends into and below the recess 25 formed in the lower surface of the member 24. The rod 52 forms one part of a normally inactive suction applying means connecting to article engaging member 24 which will now be described. The upper end of the rod 52 ex-tends through a bore 54 formed in the block 17, through a port 55 that communicates between the bore 54 and a second bore 56, and terminates in a ball valve 57 that is larger in diameter than the size of the port 55 so as to seal the latter when the ball seats at the upper end of the port 55. Communicating with the bore 54 is a vent pas-sage 58 and surrounding the rod 52 within the bore 54 is an annular seal 59.

Figure 5:
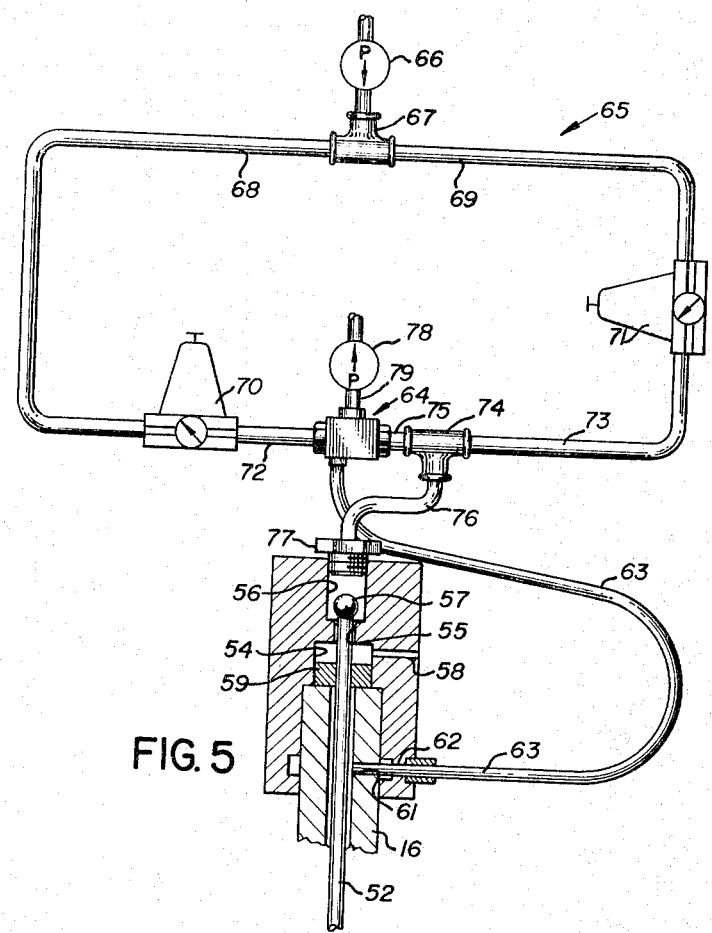
FIGURE 5 is a fragmentary, somwhat diagrammatic, elevational view of suction generating and control apparatus associated with the invention.

The diameter of the bore 53 is substantially greater than the diameter of the rod 52 so as to provide an an-nular passage 60 therebetween. The passage 60 extends the full length of the shaft 16 and at the upper end of the latter is a passage 61 that communicates with the passage 60 and with an annular groove 62a leading to a port 62 formed in the block 17. Coupled to the block 17 and communicating with the port 62 is one end of a flexible conduit 63, the other end of which is connected to a valve 64 (see FIGURE 5).

The valve 64 forms part of a pneumatic control sys-tem 65 which functions to effect engagement and release of the cap 51 by the support member 14. The system 65 comprises an air compressor or pump 66 having its high pressure side connected to a T fitting 67 from which extend conduits 68 and 69. The conduit 68 de-livers air to a low pressure, high volume regulator 70 of known construction and the conduit 69 delivers air to a high pressure, low volume regulator 71 of a similar kind. The regulator 70 is connected by a pipe 72 directly to one side of the valve 64, and the regulator 71 is connected by a pipe 73 to one side of a T coupling, 74, the opposite side of which is connected by a pipe 75 to the valve 64. From the T coupling 74 extends a flexible line 76 which communicates with the bore 56 via a fitting 77. The con-trol system also includes a suction generating pump 78 having its suction side connected by a pipe 79 to the valve 64.

The valve 64 may comprise a hollow body 80 having an inner chamber 81 in which is slideably mounted a spool 82 having a number of flanges 83, 84 and 85 there-on. During periods of inactivity of the welding appa-ratus, the parts of the valve 64 are in the positions indi-cated in FIGURE 6 with the spool 82 in its extreme left-hand position. The valve body is maintained in this position by the pressure differential created at its opposite ends by the regulators 70 and 71. That is, the air pres-sure entering the valve body 80 from the regulator 71 is greater than the pressure of air entering the valve body from the regulator 70, and the pressure of the air supplied from the regulator 71 is normally maintained because the ball valve 57 seals the port 55 at the upper end of the block 17 when the member 14 is in its normal, inac-tive position. In this position of the spool 82, the flange 84 prevents communication between the suction conduits 79 and 63.

In the operation of the apparatus, a filled container C having a loose cap or cover 51 supplied to its upper end by suitable mechanism (not shown) is introduced be-tween each orbiting set of members 14 and 34 down-stream from belt 28 and is supported with its bottom rest-ing on the incorporated seat 38. An assembly machine in which sets of orbiting members are employed is dis-closed in the previously mentioned copending applica-tion and also in FIGURE 4. As the juxtaposed mem-bers 14 and 34 are orbited by the assembly machine 1, and before the member 14 is in such orbital position as to be engaged by the drive belt 28, a change in contour of the cam 11 will cause movement of the block 17 and the shaft 16 downwardly from the position shown in FIG-URE 1 to the position shown in FIGURE 2. As the shaft 16 moves downwardly, the lower end of the actu-ating rod 52 engages an imperforate portion of the con-tainer cap 51 and arrests further lowering of the rod 52, thereby unseating the ball valve 57 from the port 55. Upon unseating of the valve 57, air from the regulator 71 is diverted from the valve 64 through the conduit 76 and flows past the valve 57 into the bore 54 and is discharged to atmosphere through the vent 58. The flow of air through the conduit 76 causes a reduction in pressure at the right-hand side of the spool 82, thereby enabling the pressure of air delivered to the valve 64 from the regulator 70 to shift the spool 82 to the right from the position shown in FIGURE 6 to the position shown in FIGURE 7. Such movement of the spool 82 establishes communication between the conduits 63 and 79, thereby creating a vaccum in the annular passage 60 which is sufficient to cause the cap 51 to be affixed, by suction, to the member 24.

In the event that a container inadvertently is not supplied with a cap 51, the rod 52 will not be vertically displaced. If the rod is not displaced, the control mechanism 65 remains inactive and no suction is generated at the cap engaging member 24. Consequently, there is no likelihood that any of the contents of the container will be sucked out of the latter.

During the time that the head 22 moves downwardly into engagement with the container C, the cam 13 acts on the support member 34 to elevate the members 39 and 41 from the position shown in FIGURE 1 to the position shown in FIGURE 2 so as to enable the member 41 partially to enclose and to grip the container section 42.

Following the engagement between the member 24 and the cap 51 and still before engagement of the pulley 27 with belt 28, the cam 11 acts on the block 17 to return the support member to an elevated position to separate the cap 51 from the container C. The carrier member 14 is elevated to such position that the level of the pulley 27 corresponds to the level of the drive belt 28.

As the shaft 3 shown in FIGURE 4 continues to rotate, the pulley 27 on the elevated carrier member 14 will engage the drive belt 28 which will effect rotation of the head 22 about the axis of the shaft 16. The speed at which the head 22 is rotated depends upon several factors, such as the particular kind of material from which the cap and container are made, the mass of the cap, and the force with which the cap subsequently is pressed against the container. It has been found that, when friction welding parts made from materials of the kind referred to earlier, and with the cap pressed against the container with only a slight force, rotation of the head at a speed of approximately 3000 r.p.m. enables satisfactory results to be achieved.

As the shaft 3 continues to rotate, the carrier member 14 will be driven beyond the trailing end of the drive belt 28 so as to disengage the latter from the pulley 27. Thereafter, the cam 11 acts on the block 17 to lower the member 14, with the head 22 spinning freely on the shaft 16, toward the container C and with the cap 51 still held in the member 24 by suction. When the member 14 has been lowered an amount sufficient to effect engagement between the cap 51 and the container C, relative rotation between the cap and the container will generate heat by friction. The heat generated by friction causes the confronting surfaces of the container and the cap to become tacky at some stage of relative rotation between the members, which rotation is at an ever decreasing speed. At this point the cap and container will fuse or weld to one another and rotation of the head 22 will cease, thereby terminating relative rotation between the cap and container and preventing breaking of the seal or weld thus formed. Because the closure 25 is separated from the container in the manner indicated prior to the friction welding operation, it may be orbited to a position in which its holder engages a drive member and then may be orbited to another position in which it disengages from the drive member and is then spinning freely when it is brought into friction welding engagement with the container C. This permits the necessary control of the speed of container C and eliminates problems concerned with disengaging the drive at the instant when fusion occurs as more particularly pointed out in the aforementioned copending application.

As the shaft 3 continues to rotate, the cams 11 and 13 will act on their respective support members to cause the sleeve 41 to move downwardly (see FIGURE 3) and the shaft 16 to move upwardly. Once the cap 51 is welded to the filled container, the weight of the latter is sufficient to break the suction grip of the member 24 on the cap 51 so as to permit the member 24 to move upwardly relative to the container. As the member 24 moves upwardly, the rod 52 descends, thereby seating the valve 5' on the passage 55, and preventing air from the regulator 71 bypassing the valve 64. As a result, the valve spool 82 is shifted from the position shown in FIGURE 7 to the position shown in FIGURE 6, thereby discontinuing the application of suction to the shaft 16.

When the members 14 and 34 are fully restored to their separated or inactive positions, the shaft 3 will have been rotated to such position as to enable the capped container C to be discharged from between the members 14 and 34. Successive members 14 and 34 proceed through the same cycle to effect sealing of the caps of additional containers.

Figure 8:
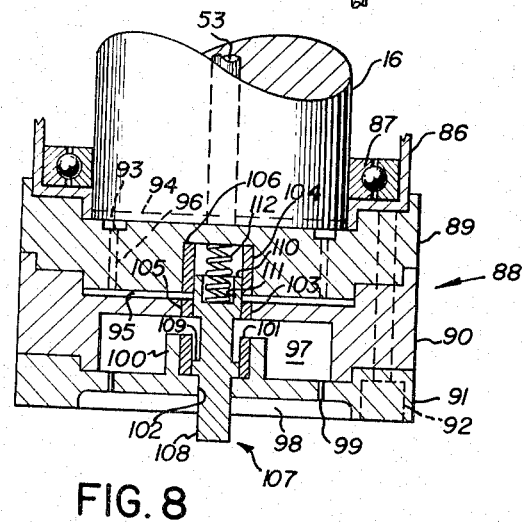
FIGURE 8 is a fragmentary, enlarged, vertical sectional view of a modified part of the apparatus.

The embodiment of the invention illustrated in FIGURE 8 functionally is quite similar to the embodiment just described and comprises a rotatable head 86 that is similar to the head 22 and which is journaled by bearings 87 on the shaft 16. Fixed on the head 86 for rotation therewith is an article engaging assembly 88 composed of three annular members 89, 90 and 91 that are joined to one another by bolts, one of which is shown at 92. The member 89 seats against the lower end of the shaft 16 and is provided with an annular groove 93 that communicates with transverse slots 94 formed in the lower surface of the shaft 16, the slots 94 also communicating with the bore 53 in the shaft 16. The member 90 seats on the member 89 and is so formed as to provide a chamber 95 between the members 89 and 90. Passages 96 extending axially of the member 89 provide communication between the groove 93 and the chamber 95.

The member 91 seats on the member 90 and they are so shaped as to provide an annular chamber 97 therebetween. A recess 98 is formed in the lower surface of the member 91 and corresponds in contour to the contour of the container cap 51. Passages 99 provide communication between the chamber 97 and the recess 98.

On the inner surface of the member 91 is an annular seal retainer 100 within which is positioned an annular seal 101. The retainer 100 surrounds an opening 102 formed in the wall of the member 91. In axial alignment with the opening 102 is an opening 103 formed in the wall of the member 90 and an axially aligned bore 104 is formed in the member 89. Seals 105 and 106 are mounted in the openings 103 and 104, respectively.

A control valve member 107 is reciprocably mounted in the article engaging assembly 88 and comprises an actuating stem 108 that projects through the opening 102. The stem 108 carries a flange 109 that is received within the annular seal 101 and terminates at its upper end in an enlarged valve body 110 having a bore 111 therein at the base of which seats one end of a compression spring 112. The opposite end of the spring bears against the base of the opening 104.

When the apparatus illustrated in FIGURE 8 is utilized, a suction pump similar to the pump 78 may be connected to the shaft 16 in the same manner as previously was described, so as constantly to apply suction to the bore 53. The other parts of the control apparatus 65 previously referred to may be eliminated. When the member 107 is in the position indicated in FIGURE 8, the application of suction to the bore 53 does not produce any suction at the recess 98 of the member 91, inasmuch as the valve body 110 prevents communication between the passages 96 and the chamber 97. Upon lowering movement of the shaft 16 in the manner previously described so as to effect engagement between the actuating stem 108 and a container cap 51, the stem 108 is displaced upwardly against the bias of the spring 112 so as to position the valve 110 wholly within the opening 104, thereby permitting communication between the chambers 95 and 97 via the opening between the seal 105 and the stem 108 provided by upward movement of the body 110. The suction generated by the suction pump then may be ap- This disclosure is intended to be representative of presently preferred apparatus and methods, but is not intended to be definitive of the invention. The invention is defined in the claims.

What is claimed is:

1. Welding apparatus comprising: frame means; first and second spaced apart members supported thereon and mounting a pair of heat fusible plastic parts therebetween; moving means connected at least to one of said members for effecting relative movement of said members to engage said parts; normally inactive suction applying means in communication with at least one of said members and capable of applying suction to the part engaged thereby; means incorporated with said suction applying means operated by a part carried by one of said members in response to relative movement of said members toward one another to activate said suction applying means and effect the application of suction to the part engaged by the member in communication with said suction applying means; and means connected with one of said members for effecting relative rotation of said members to friction weld said parts together.

2. Welding apparatus for friction welding a heat fusible plastic closure part to a heat fusible plastic container part on which it is disposed in preassembled relation but in which relation it is not actually secured to said container part, said apparatus comprising: frame means; first holder means thereon for receiving said container part; second holder means supported thereabove by said frame means for vertical movement and having a path of travel for engaging the closure part and raising it to a position above and out of engagement with the container part; means connected with said second holder means for raising it; means for rotating the second holder means and the closure part while said second holder means is in its raised position; means for then lowering the second holder means and the closure part into engagement with the container part while the second holder means and closure part is rotating to friction weld said parts together; and means incorporated with said first holder means acting on the container part to cause a relative rotation of said parts and consequent heat generation which friction welds them together.

3. Welding apparatus for friction welding a heat fusible plastic closure part to a heat fusible plastic container part on which it is disposed in preassembled relation but in which it is not actually secured to said container part, said apparatus comprising: frame means; first holder means thereon for supporting said parts one atop another; vertically movable second holder means supported above said first holder means; means for moving said second holder means in a direction toward and into engagement with the closure part and subsequently in the opposite direction; suction applying means in communication with said second holder means and operable to affix the closure part to said second holder means having a path of movement to engage the closure part; means operating said suction applying means only when a closure part is supported atop a container part; means effecting movement of said second holder means in said opposite direction to separate said parts; means for rotating said second holder means while said parts are separated; means for moving said second holder means and the closure part supported thereby toward the first holder means and the container part, following rotation of said second holder means, to effect reengagement of said parts; and means incorporated with said first holder means acting on the container part to cause a relative rotation of said parts and consequent heat generation which friction welds them together.

4. Welding apparatus for friction welding a heat fusible plastic closure part to a heat fusible plastic container part on which it is disposed in preassembled relation but in which relation it is not actually secured to said container part, said apparatus comprising: frame means; first holder means thereon for supporting said parts one atop another; vertically movable holder means supported by said frame means above said first holder means and parts; means mounting said movable holder means for movements from a raised position free of said parts to a lowered position in engagement with the closure part; means acting on said movable holder member for moving the latter cyclically from and to said positions; normally inactive suction applying means in communication with said movable holder member; actuating means carried by said movable holder member and operable in response to engagement with the closure part to activate said suction applying means and affix the closure part to said movable holder means, whereby movement of said movable holder means from said lowered position to said raised position causes the closure part to move out of engagement with the container part; drive means engageable with said movable holder means when the latter is in said raised position to rotate said movable holder means and the part affixed thereto, whereby return movement of said movable holder means to said lowered position causes the closure part to rotate on the container part; and means incorporated with said first holder means acting on the container part to cause a relative rotation of said parts and consequent heat generation which friction welds them together.

5. The apparatus set forth in claim 4 wherein said suction applying means communicates with said movable holder means via passage means extending through the latter; and movable valve means in said passage means for opening and closing the latter, said actuating means being connected to said valve means for moving the latter.

6. The apparatus set forth in claim 4 wherein said movable holder means is shaped to receive the closure part therein.

7. A method of friction welding a heat fusible plastic closure part to a heat fusible plastic container part on which it is disposed in preassembled relation but in which relation it is not actually secured to said container part, said method comprising separating said parts from one another; rotating said parts relatively to one another while they are separated; and reengaging said parts as they are relatively rotated to friction weld said parts together.

8. A method of friction welding a heat fusible plastic closure part to a heat fusible plastic container part on which it is disposed in preassembled relation but in which relation it is not actually secured to said container part, said method comprising applying suction to one of said parts to effect separation thereof; imparting rotation in one direction to said one of said parts while said parts are separated; reengaging said parts as said one of said parts is rotating and while continuing the application of suction; and disabling the other of said parts from rotating in said direction with said one part so that relative rotation generates a heat which friction welds said parts together.

9. A method of friction welding a heat fusible plastic closure part to a heat fusible plastic container part on which it is disposed in preassembled relation but in which relation it is not actually secured to said container part, said method comprising engaging one of said parts with a rotatable head member; applying suction through said head member to said one part to affix said one part to head member; moving said head member and said one part out of engagement with the other of said parts; connecting said head member with driving means to impart rotation in said direction to said one part; disengaging said head member from said driving means when said head member is rotating at a predetermined speed; reengaging said one part with said other part while said one part is rotating; and restraining said other part against rotation in said direction, whereby relative rotation generates a frictional heat weld between said parts.

10. The method set forth in claim 9 wherein said head member rotates freely following its disengagement from said driving means.

11. Apparatus for friction welding a heat fusible plastic closure part to a heat fusible plastic container part on which it is disposed in preassembled relation but in which relation it is not actually secured to said container part comprising: frame means; first holder means supported by said frame means for receiving a set of said parts; second holder means for grasping said closure part supported by said frame means above said first holder means and the parts received thereon; means on said frame means mounting said first and second holder means for relative vertical movement; means connected with at least one of said holder means for sequentially first moving said first and second holder means relatively in a direction to close the distance between them and engage the second holder means with the closure part, thence moving said first and second holder means apart to separate said parts, and thence moving said first and second holder means in a direction to close the distance between them once again and reengage the parts; means for imparting a rotation in one direction to one of said holder means when the first and second holder means have been moved in a direction to separate the parts; and means for disabling movement of the other holder means and the part therein with said rotated holder means upon reengagement of the parts so that the heat created by relative rotation friction welds said parts together.

12. The combination defined in claim 11 in which control means is provided maintaining said holders in separated position during a time interval while the holder means rotated is brought to the desired rotative speed.

13. The combination defined in claim 11 in which said second holder means incorporates container gripping means.

14. The combination defined in claim 11 in which suction means is provided; and control means, normally discommunicating said suction means and second holder means, communicates said switch means with said second holder means when the first and second holder means are initially moved toward one another to engage the closure part with the second holder means.

References Cited by the Examiner

UNITED STATES PATENTS

| | | | |
|---|---|---|---|
| 2,681,097 | 6/1954 | Gray | 156—69 X |
| 2,853,118 | 9/1958 | Schnitzius | 156—582 |
| 2,956,611 | 10/1960 | Jendrisak et al. | 156—73 |
| 3,062,695 | 11/1962 | Hull | 156—73 |
| 3,078,912 | 2/1963 | Hitzelberger | 156—73 X |
| 3,134,278 | 5/1964 | Hollander et al. | 228—2 |

OTHER REFERENCES

Metalworking Production, "Friction Welding Becomes a Production Process," Jan. 24, 1962, pp. 65–67.

EARL M. BERGERT, *Primary Examiner.*

P. DIER, *Assistant Examiner.*